United States Patent [19]

Scheiber et al.

[11] Patent Number: 5,152,724
[45] Date of Patent: Oct. 6, 1992

[54] LIQUID-COOLED MULTI-DISC BRAKE

[75] Inventors: Friedrich Scheiber, Tiefenbach; Waldemar Bier, Passau; Hermann Sonnleitner, Hauzenberg; Karl Kühner; Albrecht Lommel, both of Friedrichshafen, all of Fed. Rep. of Germany

[73] Assignee: Zahnradfabrik Friedrichshafen AG, Del.X

[21] Appl. No.: 768,612
[22] PCT Filed: Apr. 5, 1990
[86] PCT No.: PCT/EP90/00537
 § 371 Date: Sep. 30, 1991
 § 102(e) Date: Sep. 30, 1991
[87] PCT Pub. No.: WO90/12218
 PCT Pub. Date: Oct. 18, 1990

[30] Foreign Application Priority Data

Apr. 8, 1989 [DE] Fed. Rep. of Germany ....... 3911517

[51] Int. Cl.$^5$ ............................................. F16H 1/28
[52] U.S. Cl. ................................. 475/159; 188/264 E
[58] Field of Search .................. 188/264 E, 71–76; 475/20, 116, 146, 159

[56] References Cited

U.S. PATENT DOCUMENTS 2,816,630 12/1957 Kelley et al. .
3,540,557 11/1970 Hassebacher et al. .......... 188/264 E
3,768,613 10/1973 Brunner ...................... 188/264 E X
4,576,256 3/1986 Rosger ....................... 188/264 E X
4,655,326 4/1987 Osenbaugh ................... 188/264 E X

FOREIGN PATENT DOCUMENTS 0076387 4/1983 European Pat. Off. .
1249104 8/1967 Fed. Rep. of Germany .
3732760 3/1988 Fed. Rep. of Germany .
2041480 9/1980 United Kingdom .
2091359 7/1982 United Kingdom .
2142103 1/1985 United Kingdom .

Primary Examiner—Dirk Wright
Attorney, Agent, or Firm—Davis, Bujold & Streck

[57] ABSTRACT

The invention concerns a liquid-cooled multi-disc brake (29) as used in transmission systems. The object of the invention is to improve the cooling of a multi-disc brake (29) exposed to high stresses owing to frequent use. In order to increase the throughput of coolant through the multi-disc brake (29) and to intensity the coolant circulation, one inner disc carrier (10) of the multi-disc brake (29) is designed as feeder wheel (48). Such a characterized multi-disc brake (29) is preferably used within the transmission system for heavy construction vehicles such as wheeled loaders, since liquid-cooled multi-disc brakes (29) in these utility vehicles are frequently used at full engine power. However, the use of the multi-disc brake (29) according to the invention is not limited to this particular application.

23 Claims, 4 Drawing Sheets

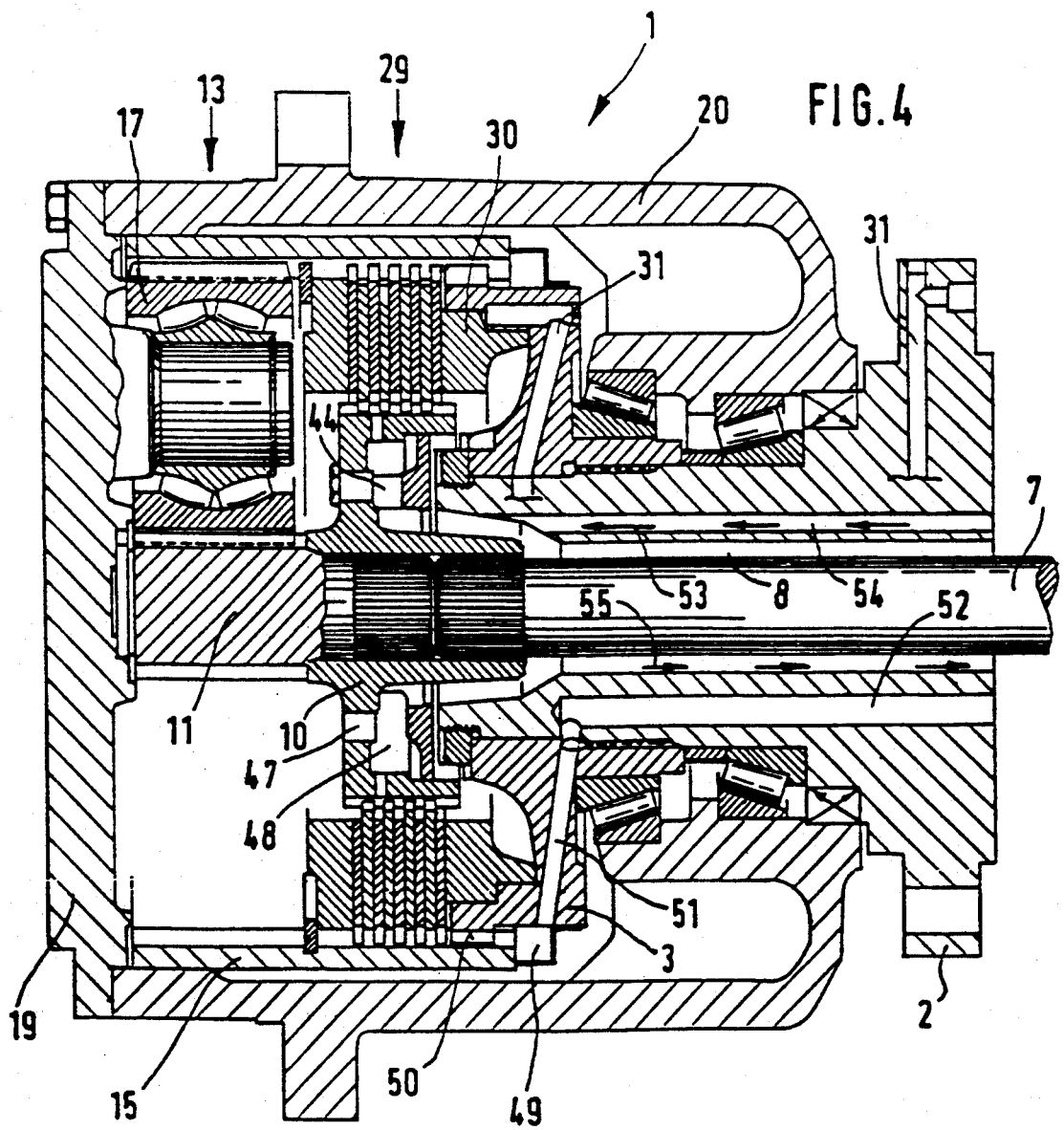

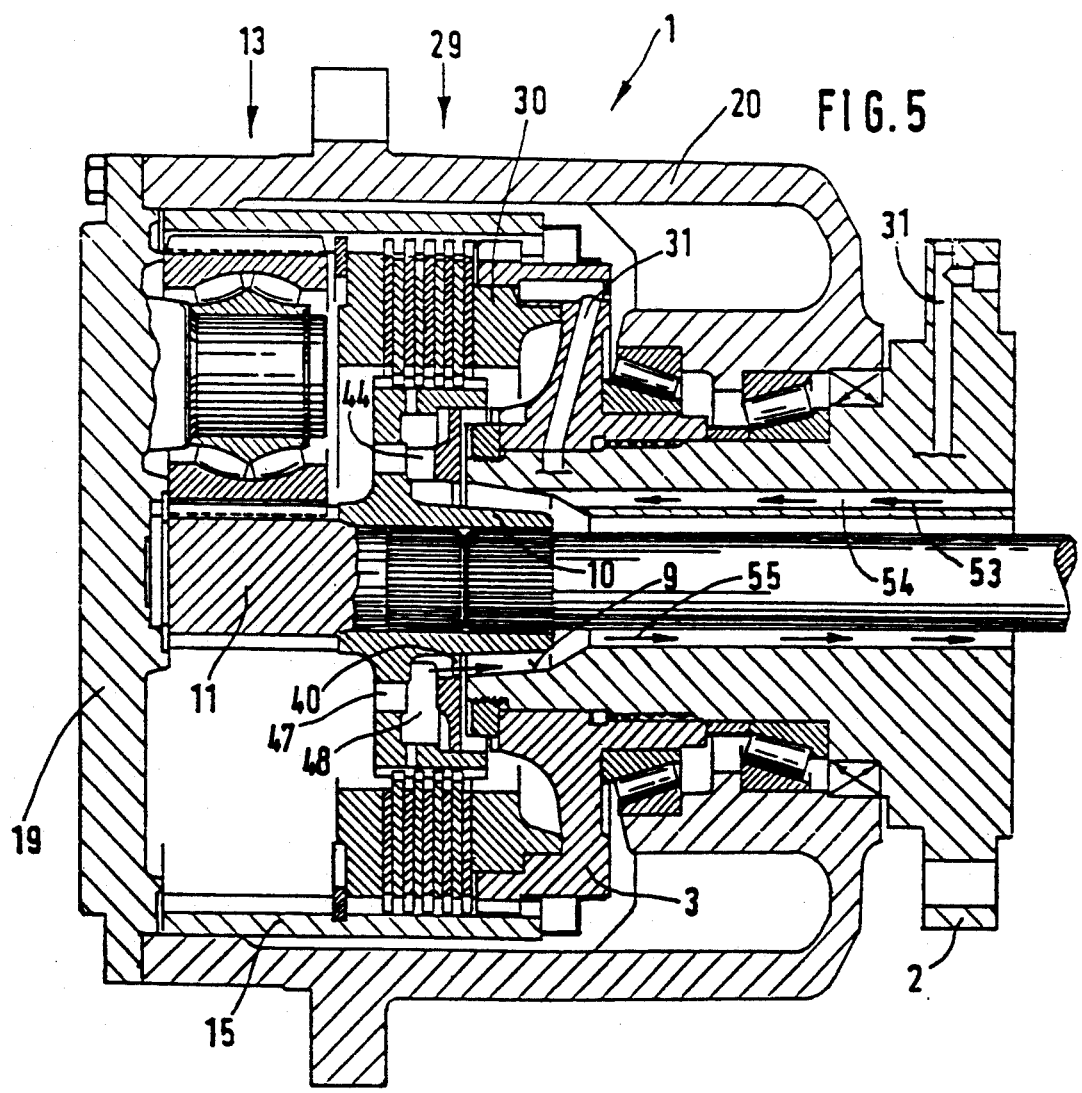

LIQUID-COOLED MULTI-DISC BRAKE

The invention concerns a liquid-cooled multi-disc brake in which an inner disc carrier is fixedly supported on a drive shaft for supporting inner brake discs, and outer brake discs, which are supported on an outer disc carrier, a feed pipe for coolant leading to the inner disc carrier, in which coolant flows through radially extending ducts of the inner disc carrier toward the inner and outer brake discs and discharges via an outlet of the outer disc carrier.

Liquid-cooled multi-disc brakes of the above mentioned kind are often used in transmission systems. Such multi-disc brakes are preferred, in particular, in heavy utility vehicles, such as wheeled loaders. Those utility vehicles are known to be subject to extreme conditions of use. The liquid-cooled multi-disc brakes are accordingly also exposed to high stresses. It is not uncommon that in a wheeled loader, for instance, in the industrial performance "load" that the multi-disc brakes can be actuated up to seven times per minute at full engine power. Under such a stress it is no wonder that the coolant can reach high limit temperatures, as will particularly occur in case of insufficient coolant throughput and high external temperatures.

DE-OS 37 32 760 has disclosed a friction brake with liquid cooling in which the coolant is fed to an annular space after which it is splashed out between the discs of a multi-disc brake making use of the centrifugal force. The circulation of the coolant is dependent on the actuation of a multi-disc brake, since during the closing or opening of the multi-disc brake the feed pipe is either opened or closed. This is disadvantageous, since the temperature of the multi-disc brake increases with the delay per time unit. Additionally, the coolant throughput through the disc assembly of that multi-disc brake is too slow. The volume of coolant available is insufficient and accordingly becomes quickly heated to high temperatures under unfavorable conditions.

European patent 00 76 387 B1 has disclosed a vehicle axle having a coolant circuit wherein a pump takes care of the forced circulation of the coolant. The coolant is sucked by a pump from a collector via a suction tube and fed via additional pipelines to the disc assembly of the multi-disc brake. The pump is a relatively expensive, important component which must be protected with special care against foreign bodies. In the solution known already, this was done by inserting a filter which was to keep away from the pump the portion, known to be relatively large, of foreign bodies in the circulating coolant. To ensure a reliable operation, a control of the filter is needed, which means an elevated maintenance cost.

British patent 20 91 350 A has also disclosed a wheel head for sprocket wheels of vehicles where the hub, in which a planetary transmission and multi-disc brake are accommodated, is partially filled with coolant. The hub is rotatably mounted on a hollow axle and is penetrated by a drive shaft. Between the drive shaft and the hollow axle an annular gap is formed through which the coolant flows toward the wheel head. The annular gap discharges in a transversal hole in the drive shaft. A hole extending in the longitudinal direction of the drive shaft creates communication between the transversal hole and radially extending ducts in the drive shaft and a disc carrier, which is part of the internal central gear of the planetary transmission. The coolant exiting on the periphery of the multi-disc brake is drained via openings in a ring-gear carrier of the planetary transmission. In this arrangement, the construction of the feed pipe for the coolant is, on one hand, expensive from the point of view of manufacturing and, on the other hand, disadvantageous in relation to the strength of the drive shaft. There must further be used an external pump—having the above mentioned disadvantages—in order to circulate the coolant.

The problem to be solved by this invention is to improve a liquid-cooled multi-disc brake of the kind mentioned above by increasing the coolant throughput as well as the intensity of the coolant circulation. In addition, the disclosed arrangement must be insensitive to the action of foreign bodies.

The problem on which the invention is based is solved by designing the inner disc carrier as a feeder wheel which rotates at the speed of the drive shaft and against which coolant flows in the region of the drive shaft—relative to the longitudinal extension thereof. The design of the disc carrier as a feeder wheel, which rotates at the speed of the drive shaft, produces a considerable increase of the coolant throughput per unit of time. Due to the inner brake discs that rotate at the speed of the drive shaft, the high specific braking performance of the multi-disc brake is preserved. The design of the disc carrier as a feeder wheel also permits a simple construction at a reasonable cost. The feeder wheel can be simply constructionally constituted so that the arrangement is fully insensitive to foreign bodies carried in the coolant. The disc carrier is disposed in a manner such that the coolant flows axially against the feeder wheel in the region of the drive shaft. Such feeding of the coolant has a great advantage in that the cross section of the drive shaft is fully preserved, that is, it is not diminished.

In the passage region of coolant into the feeder wheel, the disc carrier has an inlet gap substantially congruent with the annular gap, in which the inlet gap lies opposite to the annular gap and at a small axial distance relative to a longitudinal central plane of the drive shaft. Said small distance produces a safe guidance of the coolant and prevents turbulences in the passage region (features and advantages of claim 2).

According to another advantageous feature of the invention, the inlet gap forms the beginning of an annular feed gap of the feeder wheel which —relative to the longitudinal extension of the drive shaft—has a substantially axially oriented section which converts into a radially oriented section which on its external end is limited by a collar of the disc carrier, the radially extending ducts penetrating the collar (claim 3). In terms of fluid mechanics, the construction of the feeder wheel ensures a favorable deviation of the coolant from the discharge area of the annular gap to the collar of the disc carrier from where it enters in the brake discs of the multi-disc brake.

The coolant throughput can be controlled by the arrangement and construction of the feed elements in the feed gap. The feed elements preferably extend—radially —as seen in the topview on the feeder wheel. The radially oriented feed elements ensure a reliable conveyance of the coolant in both directions of rotation of the disc carrier (claim 4).

A favorable solution from the point of view of the finishing technique consists in that the disc carrier is composed of two parts interconnected in a manner such that —relative to the longitudinal extension of the drive shaft—the axial distance from each other is determined by spacers which establish the inner width of the radially oriented section of the feed gap (claim 5). The arrangement becomes specially simple if the feed elements are also designed as spaces (claim 6) having bolt holes in which fixing bolts can be screwed (claim 7). Both parts of the disc carrier can be screwed together in a simple manner. It is also possible to use a rivet instead of a screw connection.

According to another feature of the invention, a simple solution from the point of view of the finishing technique consists in that one part of the disc carrier is a ring which is centered by its external diameter in a recess on the collar of the disc carrier and whose internal diameter is identical with the external diameter of the inlet gap (claim 8).

A further simplification can be obtained by connecting the feed elements with the ring to form a combined part (claim 9).

According to another feature of the invention, the disc carrier has on the side opposite the inlet gap passage openings, which in relation to the longitudinal extension of the drive shaft extend substantially axially oriented (claim 10). During forward or reverse travel the disc carrier rotates at the speed of the drive shaft so that no coolant is normally fed or discharged through the passage openings. It is only when the disc carrier stops, that the passage openings effect a bypass with the inlet gap of the pump impeller or the directly axially opposite annular gap. The coolant can speedily flow off via the connection described, whereby a quick removal of heat is ensured.

The steps proposed in sub-claims 11 and 12 additionally serve to promote the quick discharge of coolant.

The steps proposed in sub-claims 13, 14 and 15—either separately or combined—serve the purpose of advancing the throughput of the coolant through the inner and outer brake discs of the multi-disc brake. The proposed construction of the inner and outer brake discs results in additionally supporting the action of the feeder impeller. The fact that the coolant is advanced in both directions of rotation of the disc carrier is of special advantage here.

When using the multi-disc brake in a wheel head whose ring-gear carrier positively meshes with an external gearing in an internal gearing of the ring gear, it is specially advantageous, in order to promote the discharge of the coolant, that the external gearing of the ring-gear carrier has passages for the coolant extending in a longitudinal direction and distributed on the periphery of the ring-gear carrier (claim 16).

According to another feature of the invention, it is advantageous, to produce an effective discharge of the coolant, that the passages discharge in a collector ring connected with the drain pipe for the coolant (claim 17).

The feature proposed in sub-claims 19, 20 and 21 concern the feeding of the coolant to the feeder wheel. From the point of view of fluid mechanics it is advantageous cup-like to enlarge the external walls of the annular gap in a direction toward the disc carrier (claim 19).

The coolant can be fed exclusively via the annular gap (claim 20).

It is further possible to feed the coolant via a feed pipe passed through the hollow axle, extending parallel to the drive shaft and discharging in the annular gap (claim 21). Let it be mentioned in this connection that the feed pipe preferably discharges in the region of the cup-like enlargement of the external walls of the annular gap.

In an advantageous embodiment of the invention, a quick removal of heat is obtained by discharging the coolant from a wheel head, (when the drive shaft is stationary), outwardly via the drain pipe passed through the ring-gear carrier via the passage openings of the disc carrier, the inlet gap of the feed gap and the annular gap (claim 22).

Another structural simplification of the arrangement can be obtained in another embodiment of the invention in that instead of the drain pipe leading through the ringgear carrier, the coolant is discharged from the head wheel, when the drive shaft is stationary, via passage openings of the disc carrier, the inlet gap of the feed gap and the annular gap (claim 23).

The volume of coolant can be additionally increased in that the drain pipe and/or the annular gap communicate(s) with the interior of an axle body. In this case the axle body simultaneously serves as heat exchanger for cooling the coolant.

Other essential features and advantages derived therefrom result from the explanation that follows of several embodiments of the invention with reference to drawings. In the drawings:

FIG. 4 is a section through a wheel head according to another of the invention; and FIG. 5 shows the structurally further simplified wheel head of FIG. 4.

Figure 1:
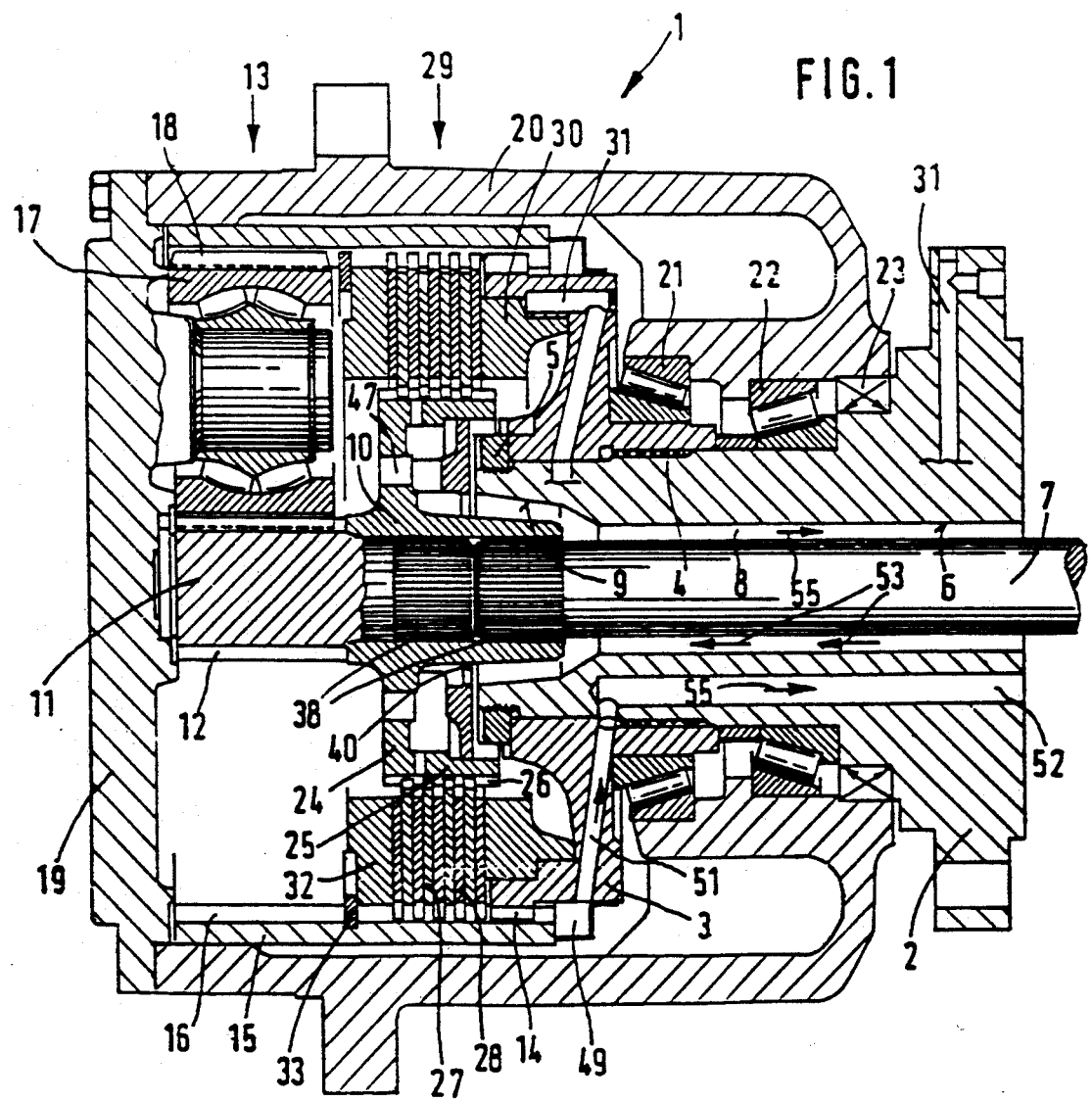
FIG. 1 shows a section extending in the longitudinal direction of a drive shaft through a wheel head according to the of the invention.

The wheel head 1, shown in section, is a component part of a vehicle axle (not shown), for instance, for a heavy wheeled loader. A hollow axle 2 is firmly screwed to an axle body (which is also not shown). The external end of hollow axle 2 carries a ring-gear carrier 3. Ring-gear carrier 3 is fixedly connected with the hollow axle 2 via an engaging gearing 4 and is axially secured by a locknut 5.

A coaxial bore 6 of the hollow axle 2 is penetrated by a drive shaft 7. The drive shaft 7 is operatively connected with an axle bevel gear (not shown) of a differential transmission. An annular gap 8 is formed between the drive shaft 7 and the bore 6 of the hollow axle 2.

The external wall of the annular gap 8 (which is identical to the surface of bore 6) is provided with a cup-like enlargement 9 on an external end.

For ease of assembly, the drive shaft 7 is divided in the region of an inner disc carrier 10. The external section 11 of the drive shaft 7 is designed in one piece with a sun 12 of a planetary transmission 13. The drive shaft 7 is fixedly connected to the external section 11. The fixed connection results by way of similarly designed engaging gears 38.

The ring-gear carrier 3 is provided with another engaging gearing 14 on its external periphery. A ring gear 15 of the planetary transmission 13 rests via said engaging gearing 14 on the ring-gear carrier 3. The ring gear 15 is provided with an internal gearing 16. Several planetary gears 17, of which only one is shown, mesh by their external gearing 18 in the internal gearing 16 of the ring 15, and thus rest on ring gear 15. The planetary gears 17 are further driven by the sun 12.

The planetary gears 17 are rotatably mounted on a web 19 which simultaneously assumes the function of a cover. The web 19 is fixedly connected with a hub 20. The hub 20 is rotatably supported via wheel bearings 21 and 22 on the hollow axle 2, or on the ring-gear carrier 3, fixedly connected therewith. The interior of the hub 20 is outwardly sealed by means of a seal ring 23.

The disc carrier 10 has an annular flange 24 on the side facing the planetary transmission 13, which on its external periphery converts to a collar 25 which faces the ring-gear carrier 3, and extends in a parallel orientation with drive shaft 7. The collar 25 has an external gearing 26 upon which inner brake discs 27 are lined up in a known manner. Together with outer brake discs 28, which are supported on the internal gearing 16 of ring gear 15, a multi-disc brake 29 is formed. The ring gear 15 forms an inner disc carrier. The multi-disc brake 29 is hydraulically actuatable. For this purpose, an annular piston 30 is provided by which the multi-disc brake 29 can be actuated in the closing direction by means of a pressurized medium which is passed into a (partly shown) pressurized-medium pipe 31. If the pressurized-medium pipe 31 is pressureless, recoil springs, (not shown) reset the annular piston 30. In addition the inner and outer brake discs 27 and 28 of multi-disc brake 29 rest axially on an end shim 32 which is retained inside the ring gear 15 by means of a guard ring 33.

Figure 2:
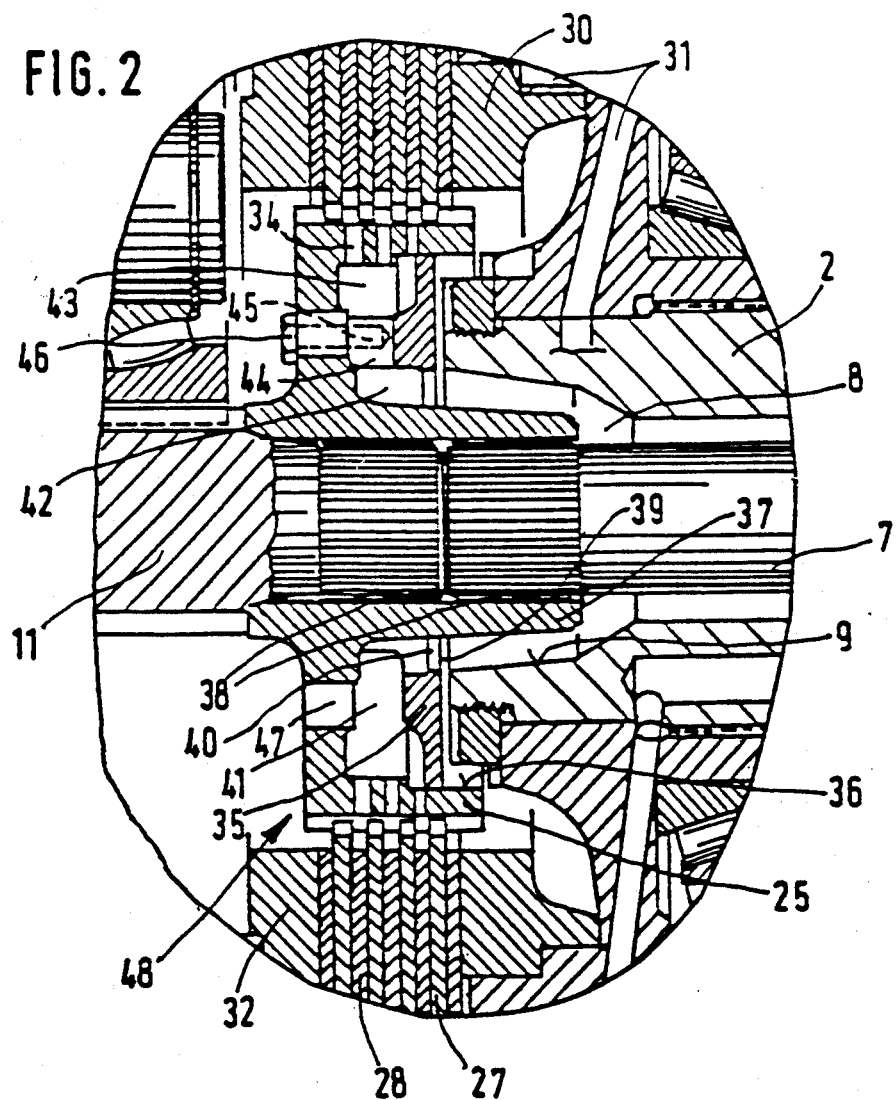
FIG. 2 is a section through a disc carrier.

From FIG. 2 the further construction and the installation position of disc carrier 10 in relation to annular gap 8 can be deduced. The collar 25 of the disc carrier is provided with radially extending ducts 34. The ducts 34 are situated to discharge between two adjacent inner brake discs, that is, the ducts are oriented with respect to an outer disc 28.

The disc carrier 10 is completed by a ring 35 centered by its external diameter in a recess 36 of the collar 25. Disc carrier 10 is therefore composed of two parts. The disc carrier 10 sinks by a hub 37 into the cup-like enlargement 9 of the annular gap 8. An inlet gap 40 lies opposite to the annular gap 8—maintaining a small axial distance 39, relative to the longitudinal extension of drive shaft 7. Both the annular gap 8 and the inlet gap 40 are preferably congruent in order to prevent turbulences in the transition zone between the annular gap 8 and the inlet gap 40. The inlet gap 40 constitutes the beginning of an annular feed gap 41. The feed gap 41 has—relative to the longitudinal extension of drive shaft 7—a substantially axially oriented section 42 that converts into a radially oriented section 43. The latter is limited on its external end by the collar 25 of the disc carrier 10. Feed elements 44 are situated in feed gap 41. In the instant case, the former are three radially oriented webs which are part of the ring 35, and are offset with respect to each other by 120° (seen in longitudinal direction of drive shaft 7). The feed elements 44 situated in the feed gap 41 further assume the function of spacers which determine the internal width of radially oriented section 43 of the feed gap 41. The feed elements 44 are further provided with bolt holes 45 shown as dotted lines in FIG. 2. Fixing bolts 46 are screwable in the bolt holes 45. The parts of the disc carrier 10 could also be interconnected by rivets as opposed to the screw connections.

Figure 3:
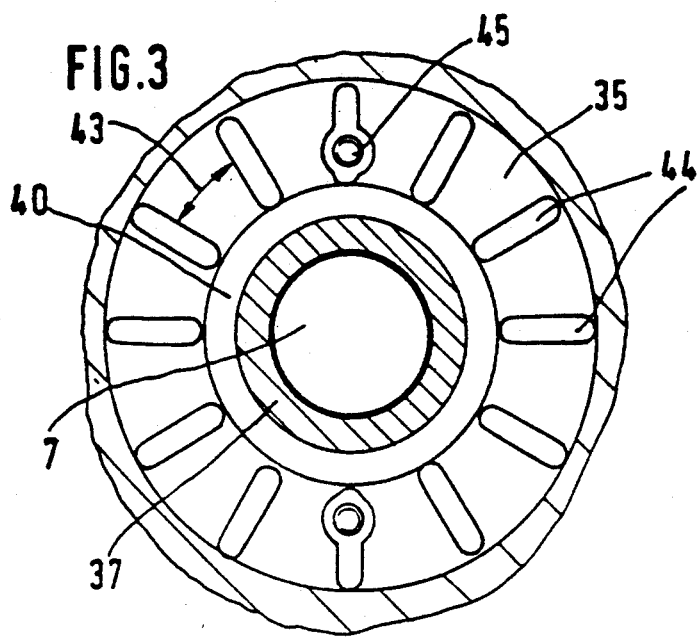
FIG. 3 shows a possible construction of one part of a disc carrier.

FIG. 3 diagrammatically reproduces another possibility of the construction of the ring 35 of the disc carrier 10. The illustration shows the ring 35 in a topview. Said ring 35 forms, when inserted, a bucket wheel. The ring 35 has for this purpose a multiplicity of radially oriented feed elements 44. Two diametrically opposite bolt holes 45 are present in order to be able to connect the ring 35 with the disc carrier 10.

The disc carrier 10 has on the side opposite to the inlet gap 10, passage openings 47 which, relative to the longitudinal extension of drive shaft 7, extend obliquely and inclined in a direction to the inlet gap 40 forming an acute angle.

The friction surfaces of the inner and outer brake discs 27 or 28 are provided with depressions (not shown) which form passages for the coolant. They extend either radially or curved, as seen in a topview, on the friction surfaces so that in both directions of rotation of multi-disc brake 29, a feeding action is exerted on the coolant.

It can be understood from the explained construction of the disc carrier 10 that it is designed as a feeder wheel 48. The latter revolves at the speed of drive shaft 7 and the coolant flows axially against it. This occurs in the region of the annular gap 8, in the case of passage into the inlet gap 40.

In the embodiments of FIGS. 1 and 2 coolant delivered by feeder wheel 48 is collected in a collector ring 49 after passing of the inner and outer brake discs 27 or 28. Passages 50 in the external gearing of the ring-gear carrier 3 facilitate the discharge of the coolant into the collector ring 49. From the collector ring 49, at least one drain pipe 51 leads through the ring-gear carrier 3 to another drain pipe 52 which extends parallel to drive the shaft 7.

In the embodiment of FIG. 1, the annular gap forms the feed pipe (arrow 53) for the coolant which runs into feeder wheel 48 from the interior of the axle bridges The coolant is drained via the collector ring 49 and either drain pipe 51 or 52. In the construction of FIG. 4, the coolant is fed (arrow 53) through a separate bore 54 into the hollow axle 2, which discharges in the region of the cup-like enlargement 9 in the annular gap 8. The coolant is drained via two separate trains of pipes. Together with the discharge of the coolant via collector ring 49 and drain pipe 51 or 52, an additional possibility of drainage for the coolant is offered through axially the oriented passage openings 47 of the disc carrier 10. When the disc carrier 10 is stationary, a short-circuited connection is formed between passage the opening 47 and the inlet gap 40 of the feeder wheel 48. The coolant is additionally drained via the annular gap 8, as indicated by arrow 55.

In the embodiment of FIG. 4 the coolant is discharged exclusively via the passage openings 47, the inlet gap 40 and the annular gap 8. In this solution, the collector ring 49 and drain pipe 51 or 52 are eliminated.

All solutions stand out by the construction of disc carrier 10 as a feeder wheel 48. The coolant flows axially through the feeder wheel 48. The feeder wheel 48, which revolves at the speed of drive shaft 7, effects an intensive delivery of the coolant. The delivery of the coolant is also maintained in the marginal zones of the inner and outer brake discs 27 and 28, since they also exert a feeding action upon the coolant.

The design of disc carrier 10 as a feeder wheel 48 has as a consequence, that together with an elevated throughput of the coolant, that wheel hub 20 almost completely fills with coolant. For cooling the multi-disc brake, a large volume of coolant is available. It is also advantageous that the feeder wheel 48 delivers coolant in both directions of rotation of disc carrier 10. A quick removal of heat from the wheel head is specially ensured when the coolant—as explained above—is discharged via two separate trains of pipes.

Reference numerals 1. wheel head
2. hollow axle
3. ring-gear carrier
4. engaging gears
5. locknut
6. bore
7. drive shaft
8. annular gap
9. enlargement
10. inner disc carrier
11. section
12. sun
13. planetary transmission
14. engaging gears
15. outer disc carrier, ring gear
16. internal gearing
17. planetary gears
18. external gearing
19. web
20. wheel hub
21. wheel bearing
22. wheel bearing
23. seal ring
24. annular flange
25. collar
26. external gearing
27. inner brake discs
28. outer brake discs
29. multi-disc brake
30. annular piston
31. pressurized-medium pipe
32. end shim
33. guard ring
34. ducts
35. ring
36. recess
37. hub
38. engaging gears
39. axial distance
40. inlet gap
41. feed gap
42. axially oriented section
43. radially oriented section
44. feed elements
45. bolt holes
46. fixing bolts
47. passage openings
48. feeder wheel
49. collector ring
50. passages
51. drain pipe
52. drain pipe
53. feed pipe
54. bore
55. drain pipe

What is claimed is:

1. A liquid-cooled multi-disc brake (29) in which is fixedly supported upon a drive shaft (7), an inner disc carrier (10) for supporting inner brake discs (27) and outer brake discs (28) which are supported on outer disc carrier (15), a feed pipe (53) for coolant which leads to said inner disc carrier designed as feeder wheel (48), said coolant flowing through radially extending ducts (34) of said inner disc carrier (10) toward said inner and outer brake discs (27, 28 and discharging, via a drain pipe (51, 52) of said outer disc carrier (15), characterized in that said feed pipe (53) is designed as annular gap (8) and said disc carrier (10) has an inlet gap (40) designed substantially identical with said annular gap (8) and which—relative to a longitudinal central plane of said drive shaft—is opposite to said annular gap (8) at a short distance so that the coolant flows axially against said feeder wheel (48) in the region of said drive shaft (7)—relative to a longitudinal extension thereof.

2. A multi-disc brake according to claim 1, characterized in that said inlet gap (40) forms the beginning of an annular feed gap (41) of said feeder wheel (48), which in relation to a longitudinal extension of said drive shaft has a substantially axially oriented section (42) which converts into a radially oriented section (43) which on its external end is limited by a collar (25) of said disc carrier (10), said radially extending ducts (34) penetrating said collar (25).

3. A multi-disc brake according to claim 1 characterized in that feed elements (44) which extend in a radial orientation are situated in said feed gap (41).

4. A multi-disc brake according to claim 1, characterized in that said disc carrier (10) is composed of two parts (10, 24, 25 and 35) interconnected in a manner such that their axial distance from each other—in relation to the longitudinal extension of said drive shaft —is established by spacers which determine the internal width of said radially oriented section (43) of said feed gap (41).

5. A multi-disc brake according to claim 1, characterized in that said feed elements (44) are designed as spacers.

6. A multi-disc brake according to claim 3, characterized in that said feed element s(44) have bolt holes (45) in which fixing bolts (46) can be screwed.

7. A multi-disc brake according to claim 3, characterized in that one component part of said disc carrier (10) is a ring (35) which is centered by its external diameter in a recess (36) on said collar (25) of said disc carrier (10) and whose internal diameter is identical with the external diameter of said inlet gap (40).

8. A multi-disc brake according to claim 3, characterized that in said feed elements (44) form a combined part with said ring (35).

9. A multi-disc brake according to claim 1, characterized in that said disc carrier (10) has passage openings (47), on the side opposite said inlet gap (40), which—relative to the longitudinal extension of said drive shaft—extend substantially axially oriented.

10. A multi-disc brake according to claim 9 characterized in that said passage openings (47) extend obliquely inclined, forming an acute angle, in a direction toward said inlet gap (40).

11. A multi-disc brake according to claim 10, characterized in that the total cross section of said passage openings (47) substantially corresponds to the cross section of said inlet gap (40).

12. A multi-disc brake according to claim 1, characterized in that said ducts (34), in relation to a longitudinal central plane of said drive shaft, discharge between two adjacent inner brake discs (27) oriented with said outer discs (38).

13. A multi-disc brake according to claim 1, characterized in that the friction surfaces of said inner and/or outer brake discs (27, 28) are provided with groove-like depressions which—as seen in top view on said friction surfaces—extend radially or curved in a manner such that in both directions of rotation of said multi-disc brake (29) a feeding action on the coolant to exerted.

14. A multi-disc brake within a wheel head whose ring-gear carrier (3) positively meshes with an external gearing (14) in an internal gearing (16) of a ring gear (15) according to claim 1, characterized in that said internal gearing (14) has longitudinally extending passages (50) for the coolant distributed on the periphery.

15. A multi-disc brake according to claim 14, characterized in that said passages (50) discharge in a collector ring (49) connected with said drain pipe (51, 52) for the coolant.

16. A multi-disc brake according to claim 15 characterized in that said collector ring (49) is formed by an end face of said ring gear (15), a surface of said ring-gear carrier (3) and an external ring.

17. A multi-disc brake according to claim 1, characterized in that an external wall (6) of said feed gap (8) is cup-like, enlarged in a direction toward said disc carrier (10).

18. A multi-disc brake according to claim 1, characterized in that said annular gap (8) exclusively forms the feed pipe (53) of the coolant.

19. A multi-disc brake according to claim 1, characterized in that at least one feed pipe (54) for the coolant extending parallel with said drive shaft (7) discharges in said annular gap (18).

20. A multi-disc brake according to claim 1, characterized in that when said drive shaft (7) is stationary, the coolant discharges outwardly via said drain pipe (51, 52) by said passage openings (47) of said disc carrier (10), said inlet gap (40) of said feed gap (41) and said annular gap (8).

21. A multi-disc brake according to claim 1, characterized in that when said drive shaft (7) is stationary, the coolant discharges via said passage openings (47) of said disc carrier (10), said inlet gap (40) of said feed gap (41) and said annular gap (8).

22. A multi-disc brake according to claim 20, characterized in that said drain pipe (51, 52) and/or said annular gap (8) is/are connected with the interior of the axle body.

23. A multi-disc brake according to claim 1, characterized in that said multi-disc brake (29) and a planetary transmission (13) are together situated in a wheel head (1) within a wheel hub (20).

* * * * *

UNITED STATES PATENT AND TRADEMARK OFFICE
CERTIFICATE OF CORRECTION

PATENT NO. : 5,152,724
DATED : October 6, 1992
INVENTOR(S) : Friedrich SCHEIBER et al It is certified that error appears in the above-identified patent and that said Letters Patent is hereby corrected as shown below:

Column 8, line 31 change "claim 1" to --claim 3--;
line 35 change "element s" to --elements--.
line 37 change "claim 3" to --claim 1--;

lines 48 and 49 change "whi-ch" to --which--.

Signed and Sealed this

Second Day of November, 1993

Attest:

BRUCE LEHMAN

Attesting Officer     Commissioner of Patents and Trademarks